United States Patent [19]

Andrews

[11] 4,352,634
[45] Oct. 5, 1982

[54] WIND TURBINE BLADE PITCH CONTROL SYSTEM

[75] Inventor: Merritt B. Andrews, Westfield, Mass.

[73] Assignee: United Technologies Corporation, Hartford, Conn.

[21] Appl. No.: 130,657

[22] Filed: Mar. 17, 1980

[51] Int. Cl.³ .............................................. F03D 7/04
[52] U.S. Cl. .................................... 416/154; 416/46; 416/157 R
[58] Field of Search .............................. 416/156–158, 416/48–49, 46, 153, 154; 91/420

[56] References Cited

U.S. PATENT DOCUMENTS

| | | | |
|---|---|---|---|
| 2,505,206 | 4/1950 | Richardson et al. | 416/48 |
| 2,507,671 | 5/1950 | May | 416/48 |
| 2,556,700 | 6/1951 | Moore et al. | 416/48 |
| 2,597,418 | 5/1952 | Westbury et al. | 416/157 X |
| 2,611,440 | 9/1952 | Haworth et al. | 416/48 |
| 2,809,702 | 10/1957 | Lambeck et al. | 416/48 |
| 3,004,608 | 10/1961 | Pond | 416/47 |
| 3,163,233 | 12/1964 | Lambeck | 416/48 |
| 3,240,275 | 3/1966 | Bennett | 416/48 X |
| 3,395,763 | 8/1968 | Avena et al. | 416/157 X |
| 3,560,108 | 2/1971 | Lindahl | 416/157 |
| 3,640,644 | 2/1972 | Liaaen | 416/157 |
| 3,767,323 | 10/1973 | Zech | 416/114 X |
| 4,007,845 | 2/1977 | Worback | 91/240 X |
| 4,201,514 | 5/1980 | Huetter | 416/37 |
| 4,243,358 | 1/1981 | Carlock et al. | 416/114 |

FOREIGN PATENT DOCUMENTS

| | | | |
|---|---|---|---|
| 605561 | 7/1948 | United Kingdom | 416/148 |
| 1406834 | 9/1975 | United Kingdom | 416/49 |

Primary Examiner—Everette A. Powell, Jr.
Attorney, Agent, or Firm—John Swiatocha

[57] ABSTRACT

Wind turbine blade pitch control system including hydraulic actuators which pivotally drive the blades about the longitudinal axis thereof to adjust the blade pitch. The actuators are supplied with hydraulic fluid from independent sources thereof for normal blade pitch adjustment and feathering. Means are provided which, during feathering, isolate the pressurization and drain of the actuators from certain system components, whereby such pressurization and drain are not hampered by any malfunction of such components.

13 Claims, 1 Drawing Figure

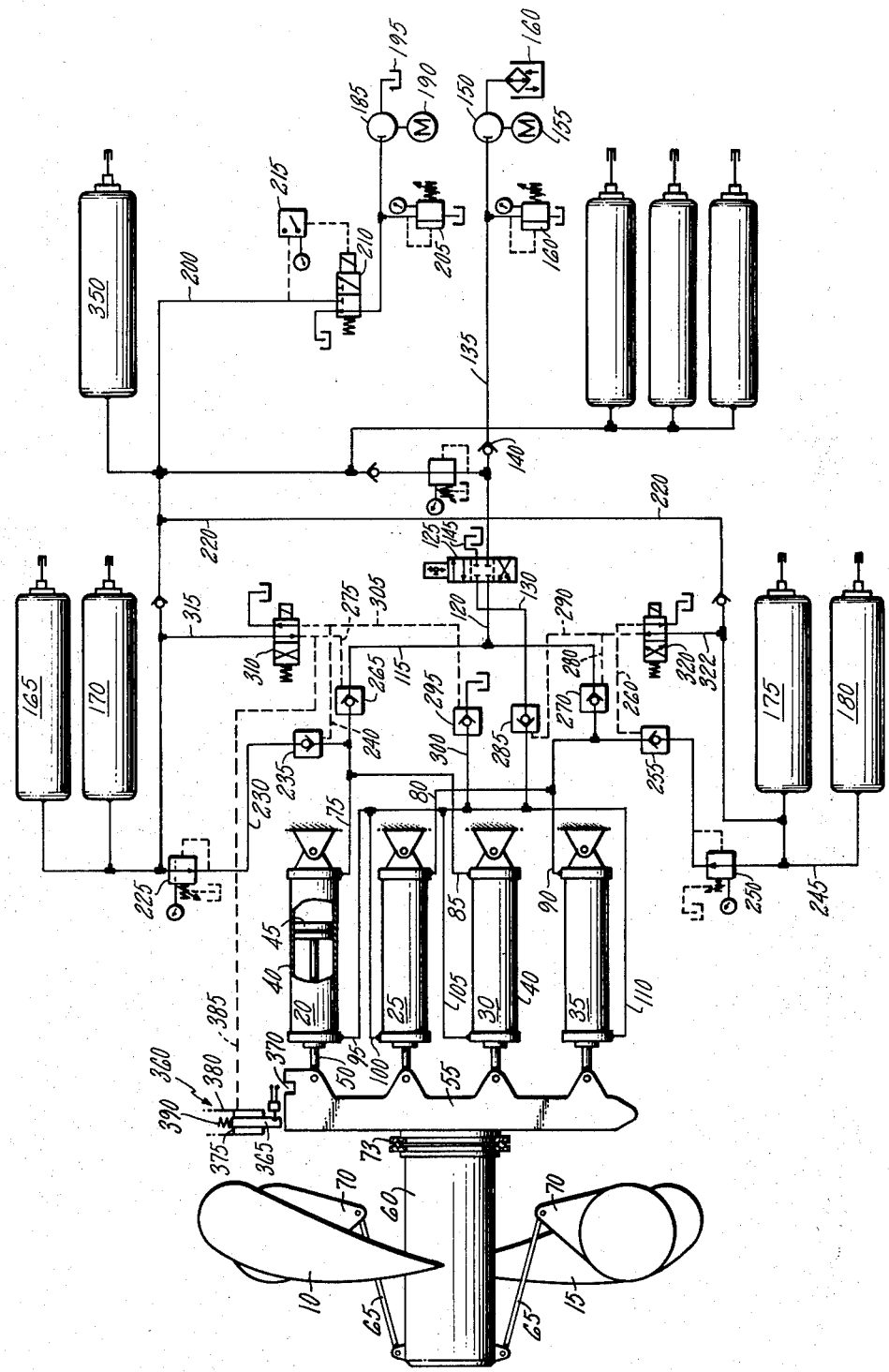

WIND TURBINE BLADE PITCH CONTROL SYSTEM

The Government has rights in this invention pursuant to Contract No. NAS3-20058 awarded by the National Aeronautics and Space Administration.

DESCRIPTION

This application is being filed on even date with U.S. patent application Ser. No. 130,659, for "Wind Turbine Blade Pitch Adjustment System" in the names of Joseph P. Harry and Edward H. Kusiak; U.S. patent application Ser. No. 130,658, for "Wind Turbine Blade Pitch Control System" in the names of Robert Sherman, Millard G. Mayo and Philip E. Barnes and U.S. patent application Ser. No. 130,656, for "Blade Pitch Actuation System" in the name of Merritt B. Andrews, all assigned to the assignee of the present invention.

Technical Field

This invention relates to wind turbines and particularly to a system for selectively adjusting the pitch of variable pitch wind turbine blades.

Background Art

For enhanced performance, wind turbines are sometimes provided with variable pitch blades. The pitch of such blades is adjusted by pivoting the blades about the longitudinal axes thereof, thereby enabling the wind turbine to perform at maximum efficiency in varying wind conditions, as well as aiding in the start-up of the turbine, and, by feathering of the blades, preventing overspeed operation of the wind turbine in high wind velocities.

Various mechanisms and control systems have been proposed for varying the pitch of wind turbine blades. One such system is disclosed in U.S. Pat. No. 4,083,651 to Cheney et al and assigned to the assignee of the present invention. This system employs pendulum members, centrifugally responsive to the rotor speed of the wind turbine to twist the blades, thereby varying the blade pitch throughout the operating range of the turbine. It will be appreciated that the blade pitch adjustment capabilities of such a system is limited by the centrifugal response of the pendulums and is automatic, responsive only to the operating parameters of the system and therefore incapable of being overriden when desired.

To provide for the continuous control of wind turbine blade pitch, it is desirable to implement hydraulic control systems wherein hydraulic fluid is selectively supplied to and drained from hydraulic actuators operatively connected to the blades. Hydraulic control systems operating on such a general principle have been employed in pitch control systems for aircraft propellers, examples of such propeller blade pitch control systems being found in U.S. Pat. Nos. 2,809,702, 2,611,440, 3,004,608, 3,163,233, 2,507,671, 2,505,206 and 2,556,700. In such systems, hydraulic fluid from a primary pump is supplied to the motor for normal pitch change adjustment. A backup or secondary pump or accumulator supplies pressurized hydraulic fluid to the motor for feathering or in the event of breakdown of the primary pump. In the '702, '440 and '608 patents, both the primary and backup, or feathering pumps draw hydraulic fluid from a common source or sump. Thus, should failure of the source or sump occur, resulting in leakage of hydraulic fluid therefrom, both the primary pitch control and backup blade pitch control systems are jeopardized thereby possibly preventing both normal pitch change adjustment and blade feathering. Furthermore, both the primary and feather sources of hydraulic fluid in these patents are valved to the blade actuator by a single control valve. Thus, should the control valve fail such as by leakage of fluid therefrom or by failure of the valve element to properly position itself, again, both normal blade pitch adjustment and blade feathering are jeopardized. In the system of the '233 patent, when feathering of the blades is required, the standby or feathering pump output is channeled through a line communicating directly with the output of the main pump. Thus, should the main pump fail it is possible that hydraulic fluid from the backup pump could leak from the system through the main pump. The systems of the '671, '206 and '700 patents, disclose control or distribution valves which selectively channel hydraulic fluid from both primary and backup or feather fluid sources to the blade actuator. Accordingly, as set forth hereinabove, should the control or distribution valve fail, the provision of hydraulic fluid to the actuator from both primary and secondary fluid sources thereof would be interrupted thereby preventing any pitch adjustment or feathering of the blades.

Disclosure of the Invention

Accordingly, it is a principal object of the present invention to provide a wind turbine blade pitch control system which overcomes the deficiencies of the prior art.

It is another object of the present invention to provide a wind turbine blade pitch control system employing discrete hydraulic fluid sources for normal blade pitch adjustment and feathering functions whereby failure of one of the sources does not cause any interruption of the function associated with the other source.

It is another object of the present invention to provide a wind turbine blade pitch control system wherein hydraulic fluid for feathering is supplied to a blade pitch change actuator independently of any valves controlling the flow of hydraulic fluid to said actuator for normal pitch change adjustment whereby the feathering capability of the system is preserved despite failure of such a control valve.

It is another object of the present invention to provide a wind turbine blade pitch control system wherein a source of hydraulic fluid for blade feathering is isolated from a first source of hydraulic fluid for normal blade pitch adjustment whereby a leakage of fluid from such first source of fluid, or from lines communicating therewith does not jeopardize the supply of hydraulic fluid from a second source thereof for blade feathering.

The wind turbine blade pitch control system of the present invention comprises at least one hydraulic actuator adapted to drive the blades in pivoting movement about their longitudinal axes, a first source of pressurized hydraulic fluid admitted to the actuator for pivotally driving the blades in a normal pitch change mode of operation and a second source of pressurized hydraulic fluid admitted to the actuator for driving the blades in a feather (accelerated, maximum blade pitch) mode of operation. Means for controlling the supply of hydraulic fluid to the actuator and draining of the actuator are provided, such means comprising a first control means which controls such supply and draining for normal blade pitch adjustment, and a second means for controlling such supply and draining for blade feathering such that during feathering, the fluid supplied the actuator from the second source, and fluid drained from the actuator are isolated from both the first source of fluid and the first control means whereby impediment of such supply and drain during feathering by a malfunction of either the first source or the first control means is obviated. In the preferred embodiment the first source comprises a slew pump discharging hydraulic fluid to a servo operated control valve (first control means). The second source comprises at least one accumulator pressurized with hydraulic fluid by an intermittently operated charge pump while the second control means comprises a first servo valve communicating with an inlet to the actuator and a second servo valve communicating with a drain from the actuator. The first servo valve blocks communication between the first control valve and the hydraulic fluid for feathering while the second servo valve blocks communication between actuator drain fluid and the first control valve. The first and second servo valves further block the actuator inlet and drain from the first source of fluid so that a malfunction of that source also does not hinder operation of the actuator during feathering.

BRIEF DESCRIPTION OF THE DRAWING

FIG. 1 is a schematic representation of a preferred embodiment of the wind turbine blade pitch control system of the present invention.

BEST MODE FOR CARRYING OUT THE INVENTION

Referring to FIG. 1, variable pitch wind turbine blades are schematically indicated at 10 and 15, it being understood that the blades are disposed generally coaxially on a rotatable hub (not shown) mechanically connected to any load such as a synchronous generator. Blades 10 and 15 are of variable pitch variety, being rotatable about the longitudinal axes thereof by actuators 20 through 35. The actuators comprise dual acting hydraulic cylinders 40 which house reciprocal pistons 45 having piston rods 50 outstanding therefrom, the rods being connected for uniform simultaneous movement thereof by a tie bar 55. The tie bar is connected to a slide block 60 connected to the blade through links 65 and clevises 70 and rotating with respect to the slide block on bearings 73. Accordingly, it will be seen that reciprocal movement of the actuator pistons and tie bar 55 causes the reciprocal movement of slide block 60 as it rotates with the wind turbine hub, this reciprocation being transformed into a pivoting of blades 10 and 15 by the linked connection with the slide block. While blades 10 and 15 are disclosed as being mechanically connected, as are the plurality of actuators which pivot the blades, it will be appreciated that the control system of the present invention is equally well suited to wind turbines wherein the blades are individually driven by one or more actuators, such as disclosed in the aforementioned copending patent applications filed on even date herewith.

As indicated by the arrows on blades 10 and 15, blade 10, as viewed in FIG. 1, pivots clockwise in an increasing pitch direction while blade 15 pivots counterclockwise when the pitch thereof is increased. Therefore, it will be seen that pistons 45 of actuators 40 translate to the left, i.e., are pressurized from the right through lines 75–90, when the pitch of the blades is increased and when the blades are feathered. Such movement of the pistons will of course drain fluid between the piston and the left end of the actuator through lines 95–110. When it is desired to reduce the blade pitch, the actuators are pressurized through lines 95–110 and drained through lines 75–90 urging the pistons to the right.

Lines 75 through 90 are connected to a first main line 115 which in turn connects to line 120 and first control valve 125. Likewise, drain lines 95 through 110 are all connected to a second main line 130 which also connects to first control valve 125.

First control valve 125 controls the supply of hydraulic fluid from main supply line 135, which feeds into valve 125 through check valve 140, and the drain of hydraulic fluid to drain or sump 145. Control valve 125 is operated by an electrical, hydraulic, or equivalent controller (not shown) which sets the valve element in one of three positions. As shown, the valve element is set in the null position wherein communication between first and second main fluid lines 120 and 130 and both main supply line 135 and drain 145 are blocked. In the second (uppermost illustrated) position, the first main line 120 and hence lines 75 through 90 are connected to main supply line 135 for the pressurization of actuators 20 through 35 in an increasing pitch or feather direction while second main line 130 and lines 95 through 110 are connected to drain for draining the left ends of the actuators. In the third (lowermost illustrated) position, the second main fluid line 130 is connected to main supply line 135 while the first main fluid line 115, through line 120 is connected to drain for pressurization and draining of actuators 20 through 35 in a blade pitch decreasing mode of operation.

Hydraulic fluid for normal blade pitch adjustment is supplied by a first source thereof comprising a pump 150 driven by electric motor 155 and drawing hydraulic fluid from a sump or reservoir 160. In the preferred embodiment, for purposes of economy, pump 150 is of the constant displacement variety, the output of the pump dependent upon the flow rate required for operation of the actuators in normal pitch change mode of operation. To militate against the overpressurization of certain of the system components, the pump may discharge through a pressure reducing or relief valve 160.

For blade feathering, wherein high flow rates of hydraulic fluid are required by actuators 20 through 35, the control system of the present invention is provided with second hydraulic fluid sources which in the preferred embodiment comprise accumulators 165 through 180. The accumulators are charged by a charge pump 185 during those periods of time when feathering of the blade is not required. The charge pump is powered by electric motor 190 and draws fluid from sump or reservoir 195. This pump is capable of high outlet pressures, for the high pressure charging of the feather accumulators, the pumps discharging to the accumulators through line 200 having disposed therein a relief valve 205 and an off-loading valve 210. As illustrated, off-loading valve 210 connects the pump 185 outlet to drain as wherein the feather accumulators are fully charged. However, when charging of the accumulators is required valve 210 is set by pressure switch 215 to the charge (righthand illustrated) position wherein the pump output is connected to the feather accumulators. Accumulators 165 and 170 are connected to the charge pump directly through line 200 while accumulators 175 and 180 are connected to the pump output through lines 200 and 220.

Feather accumulators 165 and 170 discharge through a pressure reducing valve 225 in line 230. Valve 225 reduces the pressure of the hydraulic fluid supplied by accumulators 165 and 170 to a value compatible with the valves and actuators of the remainder of the system. Also disposed in line 230 is a servo controlled feather valve 235 which prevents the discharge of fluid from accumulators 165 and 170 under all but blade feather conditions. Under such feather conditions, hydraulic pilot fluid is supplied to valve 235 through line 240 for maintenance of the valve in an open condition. In like manner, accumulators 175 and 180 discharge through line 245, pressure reducing valve 250 and feather servo valve 255 maintained open during feathering conditions by a supply of pilot fluid supplied through line 260.

To assure that the fluid from accumulators 165 through 180 is isolated from first control valve 125 and pump 150, the system of the present invention is provided with first or pitch-lock servo valves 265 and 270 disposed in opposite branches of first main line 115. Valve 265 is maintained open during normal blade pitch adjusting mode of operation by pilot fluid supplied thereto through line 275 while valve 270 is maintained open during such normal conditions by pilot fluid supplied thereto through line 280. It will be seen that when open, valves 265 and 270 each allow bidirectional flow therethrough for pressurization and draining of the actuators through lines 75 through 90. However, during blade feathering pilot fluid pressure is removed from the valves, checking flow away from the actuators thereby isolating the accumulator fluid from the first control valve 125 and pump 150.

A second or block check servo valve 285 is disposed in second main line 130 and is supplied with pilot fluid through line 290 for maintaining the valve open under conditions of normal blade pitch adjustment whereby the valve allows bidirectional flow therethrough for the pressurization and draining of the actuators through lines 95 through 110. Under feather conditions, pilot fluid pressure is removed from valve 285 whereupon the valve allows flow only away from the actuators for the draining thereof without impediment by for example, unwanted pressurization of the second main line due to a malfunction of control valve 125.

A third or feather dump servo valve 295 disposed in line 300 which connects with actuator lines 95 through 110, provides fluid communication between those actuator lines and drain. Valve 295 is closed during normal conditions such that fluid from pump 150 and first control valve 125 may be supplied to the actuators through lines 95 through 110 for decreasing the pitch of the blades without risk of premature draining of the fluid through line 300. However, during feathering, valve 295 is maintained in an open condition by pilot fluid supplied thereto through line 305 thereby preventing the impediment of actuator draining by fluid admitted to second main line 130 by, for example, a malfunction of first control valve 125.

Valves 235, 265 and 295 are controlled by a feather or second control valve 310 connected to accumulators 165 and 175 through lines 200 and 315. Likewise, valves 255, 270 and 285 are controlled by another feather or second control valve 320 connected to accumulators 175 and 180 through line 220. As illustrated, feather control valves 310 and 320 are set for normal blade pitch adjustment wherein pitch lock servo valves 265 and 270 as well as block check servo valve 285 are maintained open by pilot pressure from the associated accumulators applied to those valves through the feather control valves for normal pressurization and drain of the actuators by the selected positioning of first control valve 125 in the manner described hereinabove. Feather control valves 310 and 320, under normal conditions, connect the pilot fluid supply lines of feather valves 235 and 255 and feather dump valve 295 to drain, thereby allowing only unidirectional flow through these valves. Thus, feather valves 235 and 255 remain closed to the flow of hydraulic fluid therethrough from the feather accumulators while feather dump valve 295 remains closed to the flow therethrough from the actuators.

When feathering of the blades is required, feather control valves 310 and 320 are actuated (the valve elements thereof moved to the right) whereby the feather servo valves 235 and 255 as well as feather dump servo valve 295 are pressurized with pilot fluid thereby opening lines 230 and 245 to the discharge of hydraulic fluid from the accumulators to the actuators as well as opening line 300 for the direct drain of the actuators. Such actuation of second control valves 310 and 320 also removes pilot pressure from the pitch lock servo valves and the block check servo valve thereby isolating the pressurization and drain of the actuators from both first control valve 125 and pump 150. Accordingly, should either of these apparatus fail during blade feathering, as by unwanted leakage of hydraulic fluid therefrom, any impediment to the supply and drain of actuators 20 through 35 is prevented.

The control system of the present invention may also include a third source of hydraulic fluid additive to the first source thereof for supply to the actuators to effect blade pitch adjustments of greater than normal magnitude. Referring to the drawing, this third source may comprise one or more pitch change accumulators 350 charged by charge pump 185 through line 200 in the same manner in which the feather accumulators are charged.

The control system of the present invention may further comprise a feather lock 360 having a keeper 365 which engages tie bar 55 at a detent 370 provided therein. As illustrated, keeper 365 comprises a piston rod extending from piston 375 disposed within hydraulic latch chamber 380. A supply of pilot fluid from the accumulators is provided cylinder 380 through feather control valve 310 and line 385, the pilot fluid biasing the piston and keeper away from the tie bar thereby allowing the free movement thereof. However, on actuation of feather control valve 310 under feather conditions, the pilot fluid supply is cut off such that the keeper is biased into engagement with detent 70 by spring 390 thereby mechanically restraining the blades in a feathered position.

While there has been shown and described a preferred embodiment of the present invention, it will be understood that certain modifications of this embodiment may suggest themselves to those skilled in the art and it is intended by the appended claims to cover such modifications as fall within the true spirit and scope of this invention.

I claim:

1. A system for controlling the pitch of wind turbine blades, said system comprising a first source of pressurized hydraulic fluid; an hydraulic actuator connected to, and driving said blades in pivoting movement about the longitudinal axes thereof in response to the introduction of pressurized hydraulic fluid into said actuator for adjusting blade pitch; a first control valve for controlling the introduction of said pressurized hydraulic fluid to said actuator for normal blade pitch adjustment; at least one second source of pressurized hydraulic fluid independent of said first source thereof and supplied to said actuator for feathering said blades, and second control valve means communicating with said first and second hydraulic fluid sources for controlling the introduction of said hydraulic fluid from said second source to said actuator while maintaining isolation of said second fluid source from said first fluid source and said first control valve and for isolating said first source and said first control valve from hydraulic fluid drained from said actuator during blade feathering thereby preventing the impediment of fluid supply to, and drain from, said actuators during blade feathering by malfunction of said first source of pressurized hydraulic fluid or said first control means.

2. The system according to claim 1 and further including an hydraulic fluid reservoir, said first fluid source comprising at least one pump drawing hydraulic fluid from said reservoir, said first control valve having a first setting wherein hydraulic fluid is valved to and drained from said hydraulic actuator in such manner as to effect increasing blade pitch, and a second setting wherein hydraulic fluid is valved to and drained from said hydraulic actuator in such manner as to effect decreasing blade pitch.

3. The system according to claim 2 and further including first and second main fluid lines providing communication between said actuator and said first control valve such that said actuator drives said blades in an increasing pitch direction when said first main fluid line is pressurized with fluid and said actuator is drained through said second main line, and drives said blades in a decreasing pitch direction when said second main line is pressurized with fluid and said actuator is drained through said first main line, said second control valve means comprising a first servo valve disposed in said first main line for isolating said fluid in said first main line supplied by said second source thereof from said first control valve during blade feathering thereby preventing unwanted draining of said actuator through said first main fluid line, said second control valve means further comprising a second servo valve disposed in said second main line for isolating said one pump and said first control valve from fluid in said second main line drained from said actuator during feathering thereby preventing the impediment of said actuator fluid draining by unwanted pressurization of said second main line with hydraulic fluid.

4. The system according to claim 3 wherein said first and second servo valves are operated by hydraulic fluid supplied from said second fluid source through a second control valve which effects the maintenance of said first and second servo valves in open condition, thereby allowing the pressurization and draining of said first and second main lines through said first control valve during normal blade pitch adjustment.

5. The system according to claim 4 and further including a third servo valve providing fluid communication between said second main fluid line and drain, said third servo valve being operated by hydraulic pilot fluid supplied from said second source through said second control valve which effects the maintenance of said third servo valve in open condition thereby assuring unimpeded draining of said actuator during feathering of said blades.

6. The system according to claim 3 wherein said second hydraulic fluid source comprises at least one accumulator.

7. The system according to claim 6 wherein said first main line is divided into a pair of branch lines, each of said branch lines communicating with an individual one of at least a pair of actuators and wherein a single one of said first servo valves is disposed in each of said branch lines.

8. The system according to claim 6 and further including a charge pump supplying pressurized hydraulic fluid to said accumulator.

9. The system according to claim 1 and further including a third source of hydraulic fluid additive to said first source for supply to said actuators to effect blade pitch adjustments of greater than normal magnitude.

10. The system according to claim 9 wherein said third source of hydraulic fluid comprises a pitch change accumulator charged by a charge pump drawing hydraulic fluid from a reservoir thereof.

11. The system according to claim 1 and further including means for mechanically latching said blades in feathered positions thereof.

12. The system according to claim 11 wherein said latching means includes means operably connected to said blades and having a detent disposed therein, and a servo operated keeper engageable with said detent at a position thereof corresponding to feathered positions of said blades.

13. The system according to claim 12 wherein said means operably connected to said blades comprises a slide block connected to each of said blades by a pivotal link and reciprocably driven by said actuator.

* * * * *